United States Patent
Fiorani et al.

(10) Patent No.: US 10,980,082 B2
(45) Date of Patent: Apr. 13, 2021

(54) RRC VERSION HANDLING IN A SPLIT BASE STATION

(71) Applicant: Telefonaktiebolaget LM Ericsson (publ), Stockholm (SE)

(72) Inventors: Matteo Fiorani, Solna (SE); Angelo Centonza, Stockholm (SE); Tao Cui, Upplands Väsby (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/043,929

(22) PCT Filed: Mar. 29, 2019

(86) PCT No.: PCT/EP2019/058106
§ 371 (c)(1),
(2) Date: Sep. 30, 2020

(87) PCT Pub. No.: WO2019/192941
PCT Pub. Date: Oct. 10, 2019

(65) Prior Publication Data
US 2021/0059002 A1  Feb. 25, 2021

Related U.S. Application Data

(60) Provisional application No. 62/651,392, filed on Apr. 2, 2018.

(51) Int. Cl.
*H04W 76/27* (2018.01)
*H04W 8/24* (2009.01)
(Continued)

(52) U.S. Cl.
CPC .............. *H04W 76/27* (2018.02); *H04W 8/24* (2013.01); *H04W 24/10* (2013.01); *H04W 80/02* (2013.01); *H04W 92/24* (2013.01)

(58) Field of Classification Search
CPC ....... H04W 8/005; H04W 8/24; H04W 24/02; H04W 24/10; H04W 36/00;
(Continued)

(56) References Cited

U.S. PATENT DOCUMENTS 8,407,299 B2 *  3/2013  Bakker ............... H04L 65/1069
                                                   709/206
8,665,830 B2 *  3/2014  Bufe ................. H04W 36/0016
                                                   370/331
(Continued)

OTHER PUBLICATIONS

"GSTR-TN5G; Transport network support of IMT-2020/5G," ITU-T Technical Report, International Telecommunication Union, published Feb. 9, 2018, pp. 1-21 (Year: 2018).*
(Continued)

*Primary Examiner* — Asad M Nawaz
*Assistant Examiner* — Thomas R Cairns
(74) *Attorney, Agent, or Firm* — Sage Patent Group

(57) ABSTRACT

Methods of operating a DU node of a radio access network are disclosed. The DU node is coupled to a CU node over an F1 interface, and the DU node performs a setup procedure with the CU node over the F1 interface for an RRC connection with respect to a wireless device UE. A setup request message is transmitted to the CU node, wherein the setup request message includes an indication of a latest RRC version supported by the DU node. A setup response message is received from the CU node, wherein this message includes an indication of an RRC version supported by the CU node and by the UE. An RRC connection is established with the UE using the RRC version indicated in the setup response message. Related methods of operating a CU node are also discussed.

18 Claims, 18 Drawing Sheets

(51) Int. Cl.
*H04W 80/02* (2009.01)
*H04W 24/10* (2009.01)
*H04W 92/24* (2009.01)

(58) Field of Classification Search
CPC . H04W 36/0083; H04W 40/24; H04W 43/06; H04W 52/365; H04W 60/06; H04W 72/08; H04W 76/10; H04W 76/27; H04W 80/02; H04W 92/24; H04M 1/72525; H04L 29/06
See application file for complete search history.

(56) References Cited

U.S. PATENT DOCUMENTS

| 9,531,845 | B2* | 12/2016 | Huang | H04L 69/08 |
|---|---|---|---|---|
| 10,660,029 | B2* | 5/2020 | Zaus | H04W 8/20 |
| 10,812,629 | B2* | 10/2020 | Park | H04W 36/0033 |
| 2006/0282545 | A1 | 12/2006 | Arwe et al. | |
| 2009/0129396 | A1* | 5/2009 | Bakker | H04L 65/1006 370/400 |
| 2014/0187224 | A1 | 7/2014 | Liu et al. | |
| 2018/0249331 | A1* | 8/2018 | Chen | H04L 63/062 |
| 2020/0178204 | A1* | 6/2020 | Chen | H04W 68/005 |
| 2020/0366552 | A1* | 11/2020 | Tsuboi | H04W 28/0252 |

OTHER PUBLICATIONS

Checko, Aleksandra et al. "Cloud RAN for Mobile Networks—A Technology Overview," IEEE, published 2014, pp. 1-24 (Year: 2014).*

International Search Report and Written Opinion of the International Searching Authority, PCT/EP2019/058106, dated Jul. 11, 2019, 15 pages.

International Preliminary Report on Patentability for PCT/EP2019/058106 dated Jun. 17, 2020, 11 pages.

3rd Generation Partnership Project; Technical Specification Group Radio Access Network; NG-RAN; Architecture description (Release 15), 3GPP TS 38.401 V15.0.0 (Dec. 2017), XP051392798, 23 pages.

3rd Generation Partnership Project; Technical Specification Group Radio Access Network NR Radio Resource Control (RRC) protocol specification (Release 15), 3GPP TS 38.331 V15.0.0 (Dec. 2017), XP051392365, 188 pages.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString(SIZE(1..150,...)) | | YES | ignore |
| gNB-DU Served Cells List | | 1.. | | List of cells configured in the gNB-DU | YES | reject |
| >gNB-DU Served Cells Item | | 1..<maxCellingNBDU> | | | EACH | reject |
| >>Served Cell Information | M | | 9.3.1.10 | Information about the cells configured in the gNB-DU | - | - |

FIG. 3A

| | | | | | |
|---|---|---|---|---|---|
| >>gNB-DU System Information | O | | 9.3.1.18 | - | - |
| RRC version support | | 1 | | RRC container with system information owned by gNB-DU | |
| >RRC version support Item | | 1..<maxnoofRRCversions> | | List of RRC versions supported by the gNB-DU. | YES | reject |
| | | | | | EACH | reject |
| >>RRC version | M | | ENUMERATED (rel1500, rel1510, ....) | RRC release. | - | - |

FIG. 3B

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | PrintableString(SIZE(1..150,...)) | Human readable name of the gNB-CU. | YES | ignore |
| Cells to be Activated List | | 0..1 | | | | |
| >Cells to be Activated List Item | | 1..<maxCellingNBDU> | | List of cells to be activated | YES | reject |
| >> NR CGI | M | | 9.3.1.12 | | - | - |
| >> NR PCI | O | | INTEGER (0..1007) | Physical Cell ID | - | - |
| RRC version support | | 1 | | List of RRC versions supported by the gNB-CU. | YES | reject |
| >RRC version support Item | | 1..<maxnoofRRCversions> | | | EACH | reject |
| >>RRC version | M | | ENUMERATED (rel1500, rel1510, ...) | RRC release. | - | - |

FIG. 4

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| SpCell ID | M | | NR CGI 9.3.1.12 | Special Cell as defined in TS 38.321 [16] | YES | reject |
| Candidate SpCell List | | 0..1 | | | YES | ignore |
| >Candidate SpCell Item IEs | | 1 .. <maxnoof CandidateSpCells> | | | | |
| >>Candidate SpCell ID | M | | NR CGI 9.3.1.12 | Special Cell as defined in TS 38.321 [16] | | |
| CU to DU RRC Information | M | | 9.3.1.25 | | YES | reject |
| DRX Cycle | O | | DRX Cycle 9.3.1.24 | | YES | ignore |
| Resource Coordination Transfer Container | O | | OCTET STRING | Includes the *MeNB Resource Coordination Information* IE as defined in subclause 9.2.116 of TS 36.423 [9]. | YES | ignore |

FIG. 5A

| | | | | | |
|---|---|---|---|---|---|
| SCell To Be Setup List | 0..1 | | | YES | ignore |
| >SCell to Be Setup Item IEs | 1 .. <maxnoof SCells> | | | EACH | ignore |
| >>SCell ID | M | NR CGI 9.3.1.12 | SCell Identifier in gNB | | - |
| >>SCellIndex | M | INTEGER (0..63) | | | |
| SRB to Be Setup List | 0..1 | | | | |
| >SRB to Be Setup Item IEs | 1 .. <maxnoof SRBs> | | | | |
| >>SRB ID | M | 9.3.1.7 | | | |
| DRB to Be Setup List | 1 | | | YES | reject |
| >DRB to Be Setup Item IEs | 1 .. <maxnoof DRBs> | | | EACH | reject |
| >>DRB ID | M | 9.3.1.8 | | | - |
| >>E-UTRAN QoS | O | 9.3.1.19 | Shall be used for EN-DC case to convey E-RAB Level QoS Parameters | | |
| >>UL Tunnels to be setup List | 1 | | | | |
| >>>UL Tunnels to Be Setup Item IEs | 1 .. <maxnoof ULTunnels> | | | | |

FIG. 5B

| IE/Group Name | Presence | Range | IE type and reference | Semantics description | Criticality | Assigned Criticality |
|---|---|---|---|---|---|---|
| >>>>UL GTP Tunnel Endpoint | M | | GTP Tunnel Endpoint 9.3.2.1 | gNB-CU endpoint of the F1 transport bearer. For delivery of UL PDUs. | - | |
| >> RLC Mode | M | | 9.3.1.27 | | - | |
| >> UL Configuration | O | | UL Configurait on 9.3.1.31 | Information about UL usage in gNB-DU. | | |
| RRC version | O | | ENUMRAT ED (rel1500, rel1510, ...) | Indicates the RRC release used for configuring the UE. | - | |

FIG. 5C

```
-- ASN1START

UE-EUTRA-Capability ::=            SEQUENCE {
    accessStratumRelease               AccessStratumRelease,
    ue-Category                        INTEGER (1..5),
    pdcp-Parameters                    PDCP-Parameters,
    phyLayerParameters                 PhyLayerParameters,
    rf-Parameters                      RF-Parameters,
    measParameters                     MeasParameters,
    featureGroupIndicators             BIT STRING (SIZE (32))              OPTIONAL,
    interRAT-Parameters                SEQUENCE {
        utraFDD                            IRAT-ParametersUTRA-FDD             OPTIONAL,
        utraTDD128                         IRAT-ParametersUTRA-TDD128           OPTIONAL,
        utraTDD384                         IRAT-ParametersUTRA-TDD384           OPTIONAL,
        utraTDD768                         IRAT-ParametersUTRA-TDD768           OPTIONAL,
        geran                              IRAT-ParametersGERAN                 OPTIONAL,
        cdma2000-HRPD                      IRAT-ParametersCDMA2000-HRPD         OPTIONAL,
        cdma2000-1xRTT                     IRAT-ParametersCDMA2000-1xRTT        OPTIONAL
    }, AccessStratumRelease ::=           ENUMERATED {
    rel8, rel9, rel10, rel11, rel12, rel13,
    rel14, spare1, ...}
```

FIG. 15

RRC VERSION HANDLING IN A SPLIT BASE STATION

CROSS REFERENCE TO RELATED APPLICATIONS

This application is a 35 U.S.C. § 371 national stage application of PCT International Application No. PCT/EP2019/058106 filed on Mar. 29, 2019, which in turns claims domestic priority to U.S. Provisional Patent Application No. 62/651,392, filed on Apr. 2, 2018, the disclosures and content of which are incorporated by reference herein in their entirety.

TECHNICAL FIELD

The present disclosure relates to wireless communications and related wireless devices and network nodes, and more specifically relates to functionally split base stations with separate central and distributed units.

BACKGROUND

The current 5G Radio Access Network (NG-RAN) architecture is depicted and described in TS 38.401 as illustrated in the overall architecture of FIG. 1.

The next generation (NG) architecture can be further described as follows. The NG-RAN includes a set of 5G/NG base stations (gNBs) connected to the 5G core network (5GC) through the NG. A gNB can support frequency division duplex (FDD) mode, time division duplex (TDD) mode, or dual mode operation. gNBs can be interconnected through a logical interface, Xn. A gNB may include a gNB-CU and gNB-DUs (where CU is an acronym for central unit, and DU is an acronym for distributed unit). A gNB-CU and a gNB-DU are connected via a F1 logical interface. One gNB-DU may be connected to only one gNB-CU.

NG, Xn, and F1 are logical interfaces. For NG-RAN, the NG and Xn-C interfaces for a gNB can include a gNB-CU and gNB-DUs, and the NG and Xn-C interfaces can terminate in the gNB-CU. For EN-DC, S1-U, and X2-C interfaces for a gNB including a gNB-CU and gNB-DUs, can terminate in the gNB-CU. The gNB-CU and connected gNB-DUs may only be visible to other gNBs and the 5GC as a gNB. The NG-RAN is layered into a Radio Network Layer (RNL) and a Transport Network Layer (TNL). The NG-RAN architecture, including the NG-RAN logical nodes and interfaces between them, can be defined as part of the RNL. For each NG-RAN interface (NG, Xn, F1) the related TNL protocol and the functionality can be specified. The TNL can provide services for user plane transport and signaling transport. In NG-Flex configuration, each gNB can be connected to all AMFs within an AMF Region. The AMF Region can be defined in 3GPP TS 23.501.

An F1 interface can be open and can support the exchange of signaling information between endpoints. The F1 interface can support data transmission to respective endpoints. The F1 interface can be a point-to-point interface between endpoints. In some examples, a point-to-point logical interface can be feasible in the absence of a physical direct connection between the endpoints. The F1 interface can support control plane and user plane separation. The F1 interface can separate a RNL and a TNL. The F1 interface can enable exchange of UE associated information and non-UE associated information. The F1 interface can be defined to be future proof to fulfil different new requirements, support new services, and provide new functions. One gNB-CU and set of gNB-DUs can be visible to other logical nodes as a gNB. The gNB can terminate X2, Xn, NG and S1-U interfaces. The CU can be separated in a control plane (CP) and a user plane (UP).

With a base station implemented using separate central and distributed units, additional coordination between central and distributed units may be useful.

SUMMARY

It is an object of the present invention to improve an operation of functionally split base stations.

This object is achieved by the independent claims. Advantageous embodiments are described in the dependent claims and by the following description.

According to some embodiments, a method is provided to operate a distributed unit (DU) node of a radio access network. The method includes transmitting a first message to a central unit (CU) node that includes an indication of a radio resource control (RRC) version supported by the DU node. The method further includes receiving a second message from the CU node that includes an indication of an RRC version supported by the CU node.

According to other embodiments, a method is provided to operate a central unit (CU) node of a radio access network. The method includes receiving a first message from a distributed unit (DU) node, with the first message including an indication of a Radio Resource Control (RRC) version supported by the DU node. In addition, a second message is transmitted to the DU node, with the second message including an indication of an RRC version supported by the CU node.

According to other embodiments, a method is provided to operate a CU of a radio access network. The method includes transmitting a context setup request message for a wireless device (UE) to a DU node of the RRC version to be used for an RRC connection between the UE and the DU node of the radio access network. The context setup request message includes an indication of a Radio Resource Control, RRC, version to be used for an RRC connection between the wireless device (UE) and the DU node.

According to other embodiments, a method is provided to operate a distributed unit (DU) node of a radio access network. The method includes receiving a context setup request message for a wireless device (UE) from a central unit (CU) node of the radio access network. The context setup request message includes an indication of a Radio Resource Control (RRC) version to be used for an RRC connection between the wireless device (UE) and the DU node.

According to other embodiments, a distributed unit (DU) node is provided comprising a network interface configured to provide communications over a network; a transceiver configured to provide wireless communication over a radio interface; and a processor coupled with the network interface and the transceiver, wherein the processor is configured to provide communication with a central unit, CU, node through the network interface. The processor of the DU is configured to provide communication with a plurality of wireless communication devices through the transceiver.

In some embodiments the processor of the DU is further configured to perform or control transmitting a first message to a CU node that includes an indication of a RRC version supported by the DU node, and receiving a second message from the CU node that includes an indication of an RRC version supported by the CU node. Additionally or alternatively, the processor of the DU is configured to perform or control receiving a context setup request message for a UE from a CU node of the radio access network, wherein the context setup request message includes an indication of a Radio Resource Control, RRC, version to be used for an RRC connection between the UE and the DU node.

According to other embodiments, a central unit (CU) node is provided comprising a network interface configured to provide communications over a network; and a processor coupled with the network interface, wherein the processor is configured to provide communication with at least one distributed unit, DU, node through the network interface.

In some embodiments, the processor of the CU is further configured to perform or control receiving a first message from a DU node, with the first message including an indication of a RRC version supported by the DU node, and transmitting a second message to the DU node, the second message including an indication of an RRC version supported by the CU node. Additionally or alternatively, the processor of the CU is configured to perform or control transmitting a context setup request message for a UE to a DU node of the RRC version to be used for an RRC connection between the UE and the DU node of the radio access network. The context setup request message includes an indication of a Radio Resource Control, RRC, version to be used for an RRC connection between the UE and the DU node.

As an advantage of above-described embodiments, a risk of RRC mis-configuration may be reduced, especially when the central unit (gNB core) and distributed node(s) support different RRC versions.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 3A-B provide a table illustrating an example of F1 setup request messages from a gNB-DU to a gNB-CU according to some embodiments of the present disclosure;

FIG. 4 is a table illustrating an example of F1 setup response messages from a gNB-CU to a gNB-DU according to some embodiments of the present disclosure;

FIG. 5A-C provide a table illustrating an example of UE context setup request messages with RRC version information according to some embodiments of the present disclosure;

FIG. 15 is a table illustrating UE-EUTRA-Capability according to some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 6:
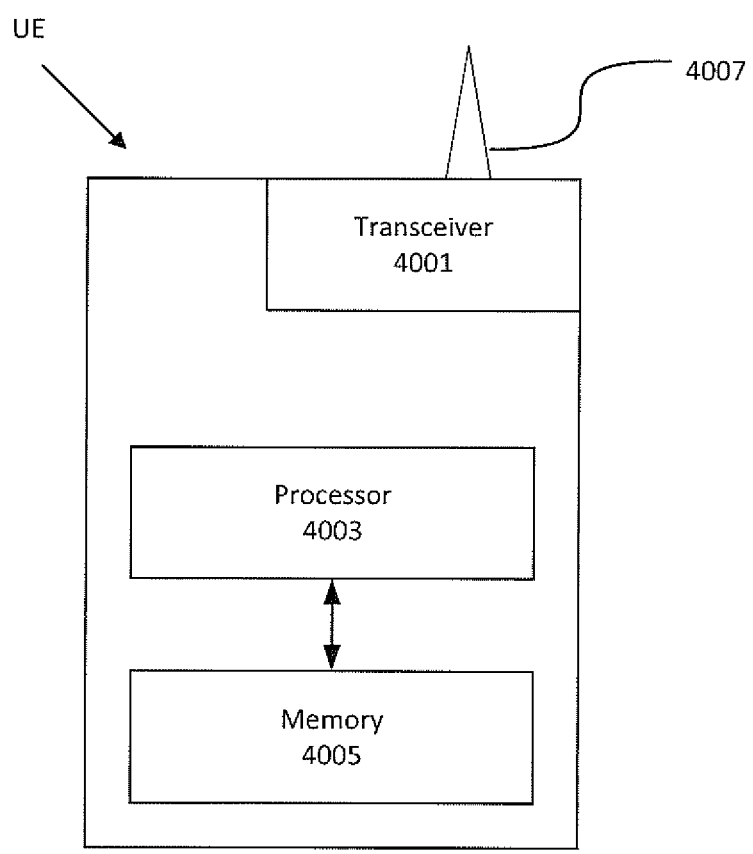
FIG. 6 is a block diagram illustrating an example of a wireless device (UE) according to some embodiments of the present disclosure.

FIG. 6 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 4007, and a transceiver circuit 4001 (also referred to as a transceiver) including a transmitter and a receiver configured to provide uplink and downlink radio communications with a base station eNB of a wireless communication network (also referred to as a radio access network RAN). Wireless device UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless device UE may also include an interface (such as a user interface) coupled with processor 4003, and/or wireless device UE may be an IoT and/or MTC device.

As discussed herein, operations of wireless device UE may be performed by processor 4003 and/or transceiver 4001. For example, processor 4003 may control transceiver 4001 to transmit uplink communications through transceiver 4001 over a radio interface to a base station of a wireless communication network (e.g., a gNB base station including a gNB-CU and one or more gNB-DUs) and/or to receive downlink communications through transceiver 4001 from a base station (e.g., a gNB base station including a gNB-CU and one or more gNB-DUs) of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 7:
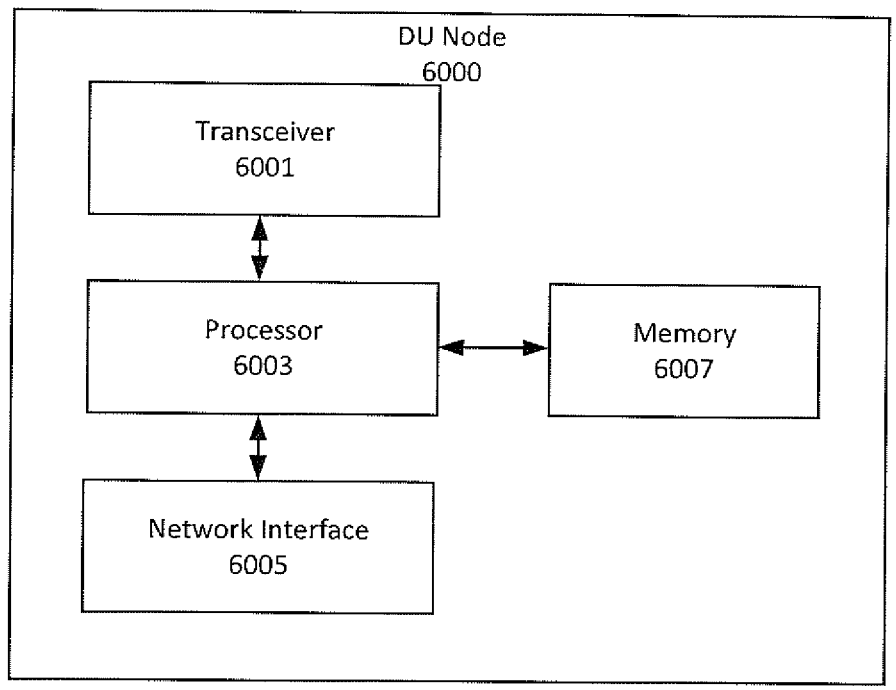
FIG. 7 is a block diagram illustrating an example of a distributed unit (DU) node according to some embodiments of the present disclosure.

FIG. 7 is a block diagram illustrating a gNB distributed unit DU node 6000 (e.g., DU node, gNB-DU, etc.) according to some embodiments disclosed herein. As shown, DU node 6000 may include processor 6003 coupled with transceiver 6001, network interface 6005, and memory 6007. Transceiver 6001 may include one or more of a cellular radio access network (RAN) interface (also referred to as a RAN transceiver) and/or another wireless network communication interface. DU node 6000 can thus provide wireless communication over one or more radio links with one or more mobile communication devices. Network interface 6005 may provide communication with other network nodes/devices such as an gNB central unit CU node (e.g., CU node, gNB-CU, etc.), for example, over an F1 interface. Processor 6003 (also referred to as a processor circuit or processing circuitry) may include one or more data processing circuits, such as a general purpose and/or special purpose processor (e.g., microprocessor and/or digital signal processor). Processor 6003 may be configured to execute computer program instructions from functional modules in memory 6007 (also referred to as a memory circuit or memory circuitry), described below as a computer readable medium, to perform some or all of the operations and methods that are described herein for one or more of the embodiments. Moreover, processor 6003 may be defined to include memory so that separate memory 6007 may not be required.

As discussed herein, operations of DU node 6000 may be performed by processor 6003, network interface 6005, and/or transceiver 6001. For example, processor 6003 may control transceiver 6001 to transmit downlink communications through transceiver 6001 over a radio interface to one or more UEs and/or to receive uplink communications through transceiver 6001 from one or more UEs over a radio interface. Similarly, processor 6003 may control network interface 6005 to transmit communications through network interface 6005 to one or more other network nodes (e.g., to a CU node) and/or to receive communications through network interface 6005 from one or more other network nodes (e.g., a CU node). Moreover, modules may be stored in memory 6005, and these modules may provide instructions so that when instructions of a module are executed by processor 6003, processor 6003 performs respective operations (e.g., operations discussed below with respect to Example Embodiments).

Figure 8:
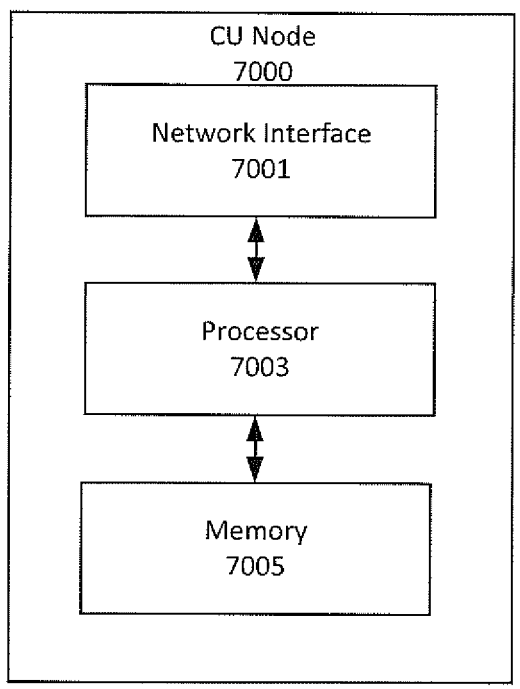
FIG. 8 is a block diagram illustrating an example of a central unit (CU) node according to some embodiments of the present disclosure.

FIG. 8 is a block diagram illustrating a gNB central unit CU node 7000 according to some embodiments disclosed herein. As shown, CU node 7000 may include processor 7003 coupled with network interface 7001 and memory 7005. Network interface 7001 may provide communication with other network nodes/devices such as a plurality of DU nodes, for example, over respective F1 interfaces. Processor 7003 (also referred to as a processor circuit or processing circuitry) may include one or more data processing circuits, such as a general purpose and/or special purpose processor (e.g., microprocessor and/or digital signal processor). Processor 7003 may be configured to execute computer program instructions from functional modules in memory 7005 (also referred to as a memory circuit or memory circuitry), described below as a computer readable medium, to perform some or all of the operations and methods that are described herein for one or more of the embodiments. Moreover, processor 7003 may be defined to include memory so that separate memory 7005 may not be required.

As discussed herein, operations of CU node 7000 may be performed by processor 7003 and/or network interface 7001. For example, processor 7003 may control network interface 7001 to transmit communications through network interface 7001 to one or more other network nodes (e.g., to one or more DU nodes) and/or to receive communications through network interface 7001 from one or more other network nodes (e.g., one or more DU nodes). Moreover, modules may be stored in memory 7005, and these modules may provide instructions so that when instructions of a module are executed by processor 7003, processor 7003 performs respective operations (e.g., operations discussed below with respect to Example Embodiments).

Figure 1:
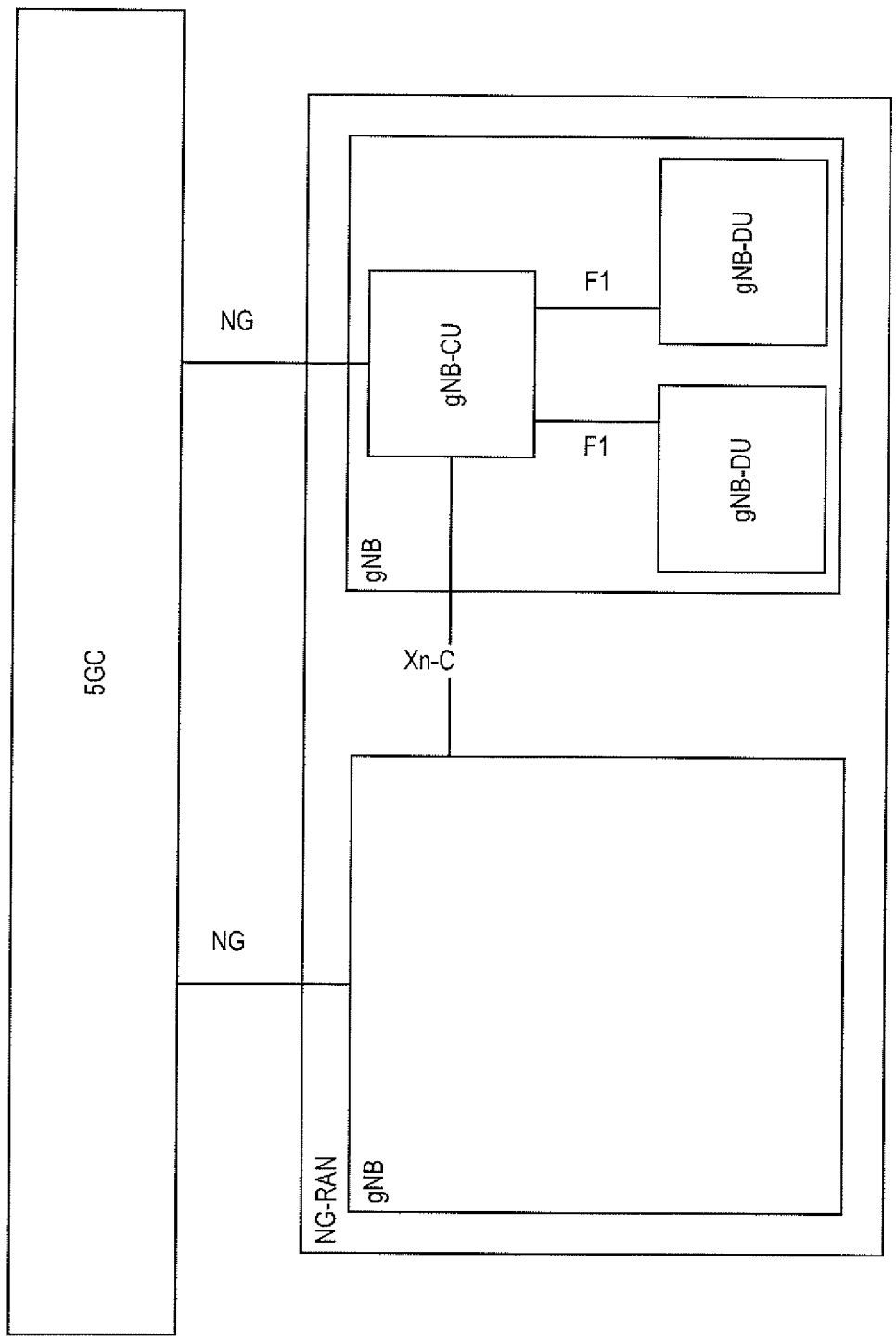
FIG. 1 is a block diagram illustrating an example of a 5G Radio Access Network.
Figure 2:
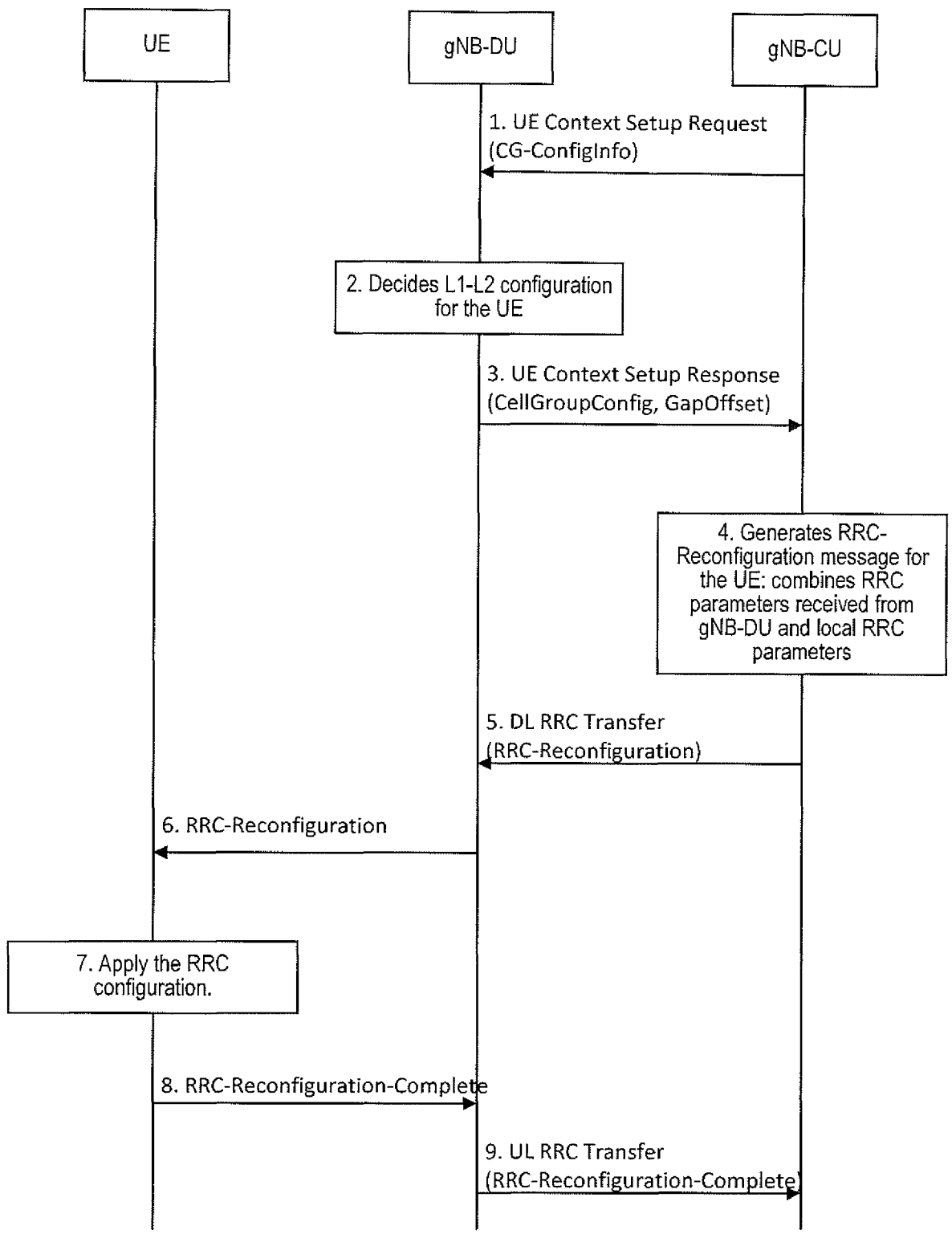
FIG. 2 is a signal flow diagram illustrating an example of generating and transmitting a RRC configuration to a UE according to some embodiments of the present disclosure.

In RRC configurations, the gNB-CU and the gNB-DU can together be responsible for generating and transmitting the RRC configuration to the UE. For example, FIG. 2 depicts a procedure in a NR stand-alone (NSA) for generating and transmitting the RRC configuration to the UE at the time of creation of a UE context.

Transmission 1 can be transmitted from the gNB-CU to the gNB-DU. Transmission 1 can include a F1 UE Context Setup Request message having a CG-ConfigInfo RRC container. The CG-ConfigInfo RRC container can include RRC parameters available at the gNB-CU (e.g., measurement frequencies, UE radio capabilities and radio bearer configuration).

In block 2, the gNB-DU can, based on the information in the CG-ConfigInfo RRC container, select a L1-L2 configuration (e.g., phy-config and mac-config) for the UE and the measurement gap offset.

Transmission 3 can be transmitted from the gNB-DU to the gNB-CU. Transmission 3 can include the F1 UE Context Setup Response message, which can include the CellGroupConfig RRC container (with the selected L1-L2 configuration) and the Gap-Offset RRC container (with the measurement gap offset for the frequencies selected by the gNB-CU).

In block 4, the gNB-CU can generate the RRC-Reconfiguration message by combining the RRC parameters received by the gNB-CU (CellGroupConfig and Gap-Offset) and local RRC parameters (e.g., MeasConfig and RB-Config).

Transmission 5 can be transmitted from the gNB-CU to the gNB-DU and can include the DL RRC Transfer message (including the RRC-Reconfiguration message). Transmission 6 can be transmitted from the gNB-DU to the UE and can include the RRC-Reconfiguration message.

In block 7, the UE can apply the RRC configuration indicated in the RRC-Reconfiguration message.

Transmission 8 can be transmitted from the UE to the gNB-DU if the configuration in the UE is successful. Transmission 8 can include the RRC-Reconfiguration-Complete message, which can be included in transmission 9 (UL RRC Transfer message) transmitted from the gNB-DU to the gNB-CU.

In some examples, RRC reconfigurations can be performed towards a UE at any time during the lifespan of a connection between the UE and a RAN. The gNB-DU and gNB-CU can exchange information concerning system information to be broadcast or to be signaled to the UE in a dedicated way. The system information can also be part of the RRC protocol.

The gNB-CU and the gNB-DU may support different RRC versions. This can occur in multivendor deployments where the gNB-CU and the gNB-DU are from different vendors that release software upgrades at different times. If the gNB-CU and gNB-DU support different RRC versions, the procedure described in FIG. 2 (or in general procedures by which the gNB-DU and gNB-CU exchange RRC parameters for the purpose of signaling or broadcasting to the UE RRC messages/information that are the result of combining parameters from the gNB-DU and from the gNB-CU) may fail. In block 4 of the procedure depicted in FIG. 2, the gNB-CU can generate an inconsistent RRC-Reconfiguration message, an RRC message containing some RRC parameters from one RRC version and some others from a different RRC version. When the UE receives this inconsistent RRC-Reconfiguration message, the UE configuration in block 7 may fail or cause miss-configuration in the UE. In some examples, the UE may consider that there was a network configuration error and trigger reconfiguration failure and thus re-establishment. Therefore, it can be valuable to have both gNB-CU and gNB-DU use the same RRC version when configuring the UE.

The situation may occur when system information is created by merging information from the gNB-DU and gNB-CU. In this case, the UE may not immediately report an error but assume a certain, potentially inconsistent, configuration. The UE behavior as a consequence can become unpredictable and possibly erroneous.

The present disclosure presents methods and devices for exchanging the supported RRC version between nodes that are involved in generating information to form RRC messages towards the UE. In some examples, such nodes may be the gNB-CU and gNB-DU, and exchange of RRC information may occur over the F1 interface.

In some embodiments, the gNB-CU and the gNB-DU can exchange the supported RRC version during the F1 Setup procedure. For example, the gNB-DU can send a list of supported RRC versions (or the highest version of each supported release) in the F1 Setup Request message and the gNB-CU can reply with a list of supported RRC versions in the F1 Setup Response message. The gNB-CU and the gNB-DU can then employ an RRC version that is supported by both nodes (and by the UE). In additional or alternative embodiments, the gNB-CU and the gNB-DU may only exchange the latest supported RRC version, implying that all the previous RRC versions are also supported. In additional or alternative embodiments, the gNB-CU and the gNB-DU can exchange the supported RRC versions via an O&M interface.

In some embodiments, the gNB-CU and the gNB-DU may seek to employ an RRC version that is supported by the UE. To make sure that the RRC version is supported by the UE, the gNB-CU can select an RRC version (e.g., based on the UE radio capabilities). Then, the gNB-CU can transmit the selected RRC version for the UE to the gNB-DU in the UE Context Setup Request. The RRC version that is selected for the UE may be among the RRC versions that are supported by both the gNB-CU and the gNB-DU. The gNB-DU can employ the RRC version indicated in the UE Context Setup Request to generate the configuration for the UE. In additional or alternative embodiments, even if the gNB-CU and the gNB-DU support the same RRC version, they may not support the same features. A node that receives a request for a feature that it does not support, can read the content of the RRC container, and either ignore the requested feature or trigger a failure with appropriate cause value toward the sending node.

In some embodiments, a gNB-DU or gNB-CU can receive an F1 message containing RRC parameters from the other node, and if such parameters are not supported, for example because they correspond to a newer version of RRC than what the receiving node supports, the node receiving such parameters can generate a failure or an error message towards the sending node, including a cause value highlighting that the RRC version used by the sending node is not supported at the receiving node. When such error or failure message is received, the receiving node may decide to use a lower RRC version for the next signaling exchange where RRC parameters will be signaled to the other node. The mechanism may be iterated until no more error or failure messages with a cause value pointing at not supported RRC version are received. The latter will automatically indicate that both nodes are using RRC parameters from RRC versions that they both support.

The proposed mechanisms can reduce the risk of RRC miss-configurations due to the gNB-DU and the gNB-CU supporting different RRC versions.

In some embodiments, supported RRC versions can be exchanged in a F1 Setup procedure. The gNB-DU can include a list of supported RRC versions in the F1 Setup Request message, and the gNB-CU can include a list of supported RRC versions in the F1 Setup Response message. The supported RRC version can, for example, be identified by the Release number, as shown in the tables depicted by FIGS. 3A-B and 4. FIGS. 3A-B depict a first table that shows the F1 Setup Request message from a gNB-DU to a gNB-CU. FIG. 4 depicts a second table that shows the F1 Setup Response message from a gNB-CU to a gNB-DU.

In some embodiments, supported RRC versions can be exchanged in a UE Context Setup procedure. The gNB-CU can send a selected RRC version for a UE in a UE Context Setup Request message of FIG. 2. The gNB-DU can use the RRC version indicated by the gNB-CU to perform the UE configuration (e.g., for generating CellGroupConfig and Gap-Offset RRC containers) at block 2 of FIG. 2. This can provide/ensure the gNB-CU and the gNB-DU adopt the same RRC version to configure a given UE. In additional or alternative embodiments, the gNB-CU can select the RRC version to use based on UE functionality to be configured and according to the UE dedicated feature capabilities. FIG. 15 provides UE-EUTRA-Capability information that may be used according to some embodiments. The EUTRA capabilities of FIG. 15 are shown by way of example, but embodiments of inventive concepts may be provided using other UE radio capabilities.

FIGS. 5A-C provide a table that shows the UE Context Setup Request message with the proposed addition used to exchange the RRC version selected for the UE.

In some embodiments, an indication can be given of a not supported version via failure or error message. In the case of the F1: UE Context Setup procedure, a UE Context Setup Failure may be generated if the UE Context Setup Request message contains RRC parameters that are not supported by the receiving node. A new cause value may be included in the Cause Information Element IE in the F1 UE Context Setup Failure, and such cause value may be defined as "RRC Version Not Supported", or any equivalent encoding conveying the same cause. In additional or alternative embodiments, such cause may be added to any failure message that is due to a not supported RRC version. In the case of the F1: UE Context Setup procedure, if a UE Context Setup Response is generated and received by the gNB-CU, it may not be possible to generate a UE Context Setup Failure. In this case, if the gNB-CU receives RRC parameters that are not compatible with the RRC version supported, the gNB-CU may generate an Error Indication message towards the gNB-DU. This message may indicate a cause value similar to that described above. The Error Indication message can be issued as a response by the receiving node in any case of reception of non-compatible RRC parameters.

According to some embodiments of the present disclosure, supported RRC versions may be exchanged between gNB-CU and gNB-DU nodes to reduce error and/or misconfigurations in the wireless device UE.

Figure 9:
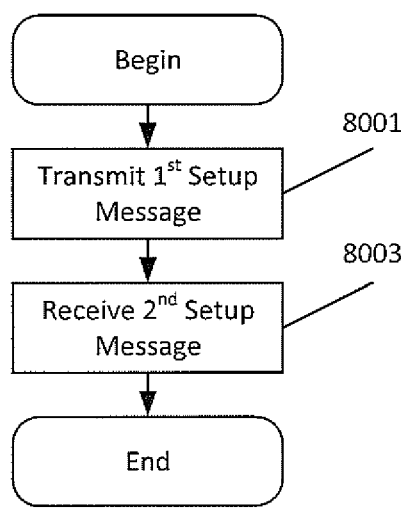
FIG. 9 is a flow chart illustrating an example of operations of a DU according to some embodiments of the present disclosure.
Figure 12:
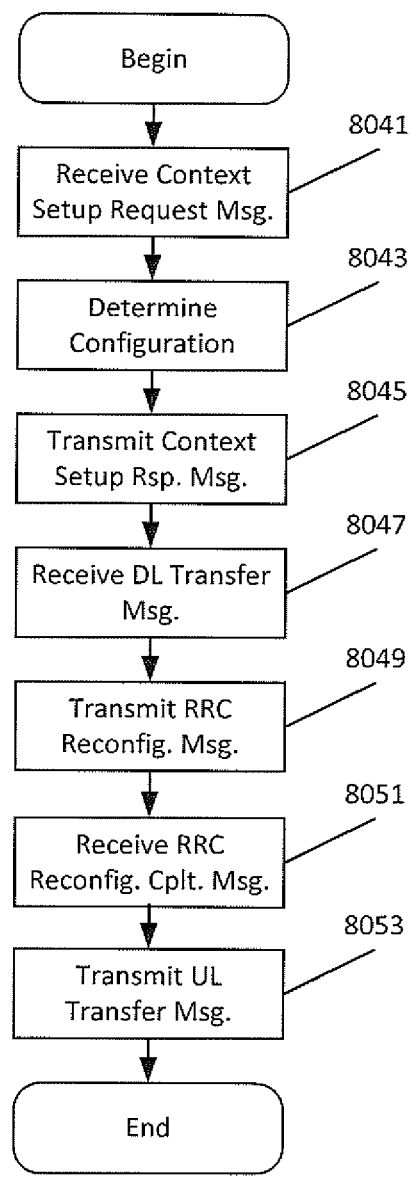
FIG. 12 is a flow chart illustrating another example of operations of a DU according to some embodiments of the present disclosure.
Figure 14:
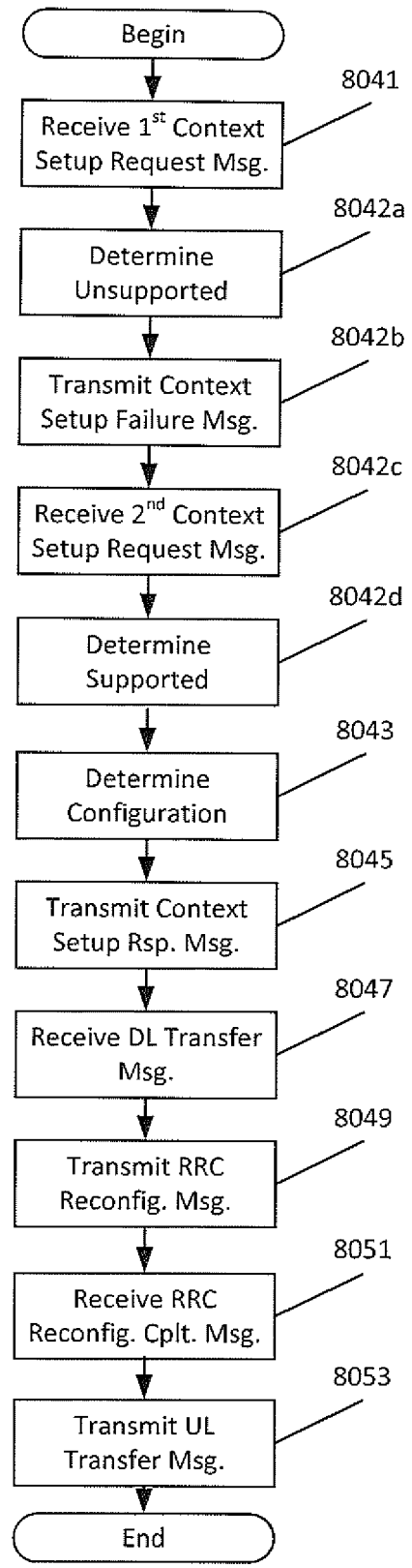
FIG. 14 is a flow chart illustrating another example of operations of a DU according to some embodiments of the present disclosure.

Operations of DU node 6000 are illustrated by the flow charts in FIGS. 9, 12, and 14 according to some embodiments of the present disclosure. For example, modules may be stored in memory 6007 of FIG. 7, and these modules may provide instructions so that when the instructions of a module are executed processor 6003, processor 6003 performs respective operations of the flow chart of FIGS. 9, 12, and 14. Moreover, DU node 6000 may be a node of a gNB that also includes a central unit CU node with which DU node 6000 communicates.

FIG. 9 illustrates an example of DU node operations according to some embodiments. At block 8001, processor 6003 can transmit a first message through network interface 6005 to a CU node. The message can include an indication of a RRC version supported by the DU node. At block 8003, processor 6003 can receive a second message from the CU node through network interface 6005. The second message can include an indication of an RRC version supported by the CU node.

In additional or alternative embodiments, the indication of the RRC version supported by the DU node can include a list of RRC versions supported by the DU node, and/or the indication of the RRC version supported by the DU node can include a most current RRC version supported by the DU node.

In additional or alternative embodiments, the indication of the RRC version supported by the CU node can include a list of RRC versions supported by the CU node, and/or the indication of the RRC version supported by the CU node can include a most current RRC version supported by the CU node.

In additional or alternative embodiments, the indication of the RRC version supported by the DU node can include at least one release number of an RRC version supported by the DU node, and the indication of the RRC version supported by the CU node can include at least one release number of an RRC version supported by the CU node.

In additional or alternative embodiments, the first message can be a setup request message, and the second message can be a setup response message.

In additional or alternative embodiments, the DU node and the CU node can be coupled over an F1 interface. The first and second messages can be first and second setup messages of an F1 setup procedure. The first setup message can be transmitted over the F1 interface to the CU node. The second setup message can be received over the F1 interface from the CU node.

In additional or alternative embodiments, the DU node and the CU node can be coupled over an F1 interface and over an Operation and Maintenance O&M interface. The first message can be transmitted over the O&M interface to the CU node. The second message can be received over the O&M interface from the CU node.

FIG. 12 illustrates an example of DU node operations according to some embodiments. At block 8041, processor 6003 can receive a context setup request message for a UE from a CU node 7000 of the radio access network through network interface 6005. The context setup request message can include an indication of an RRC version to be used for an RRC connection between the UE and the DU node. At block 8043, processor 6003 can determine a configuration for the UE based on the context setup request message including the indication of the RRC version to be used for the RRC connection between the UE and DU node. At block 8045, processor 6003 can transmit a context setup response message for the UE through network interface 6005 to the CU node. The context setup response message can include information regarding the configuration for the UE. At block 8047, processor 6003 can receive a transfer message from the CU node through network interface 6005. The transfer message can include an RRC reconfiguration message for the UE. At block 8049, the processor 6003 can transmit the RRC reconfiguration message through transceiver 6001 to the UE. At block 8051, processor 6003 can receive a RRC reconfiguration complete message through transceiver 6001 from the UE after transmitting the RRC reconfiguration message. At block 8053, processor 6003 can transmit an uplink transfer message through network interface 6005 to the CU node. The uplink transfer message can include the RRC reconfiguration complete message.

In additional or alternative embodiments, the context setup response message can include measurement gap offset information and/or cell group configuration information for the RRC connection between the wireless device UE and the DU node.

In additional or alternative embodiments, the context setup response message can include cell group configuration information including at least one of physical layer and/or medium access control layer information.

FIG. 14 illustrates an example of DU node operations for embodiments. FIG. 14 includes operations/blocks similar to those discussed above with respect to FIG. 12, but FIG. 14 further include blocks 8042*a-d*. At block 8041, processor 6003 can receive a first context setup request message for a wireless device (UE) from a central unit CU node of the radio access network through network interface 6005, and the first context setup request message can include an indication of a first RRC version to be used for an RRC connection between the wireless device (UE) and the DU node. At block 8042*a*, processor 6003 can determine that the first RRC version (from the first context setup request message of block 8041) is unsupported. At block 8042*b*, processor 6003 can transmit a context setup failure message through network interface 6005 to the CU node. At block 8042*c*, processor 6003 can receive a second context setup request message for the wireless device UE from the CU node through network interface 6005. The second context setup request message can include an indication of a second RRC version to be used for the RRC connection between the wireless device UE and the DU node. The first and second RRC versions can be different. At block 8042*d*, the processor 6003 can determine that the second RRC version is supported.

Responsive to determining that the second RRC version is supported at block 8042*d*, processor 6003 can determine a configuration for the wireless device (UE) based on the second context setup request message including the indication of the second RRC version to be used for the RRC connection between the wireless device (UE) and the DU node at block 8043. At block 8045, processor 6003 can transmit a context setup response message for the wireless device (UE) through network interface 6005 to the CU node. The context setup response message can include information regarding the configuration for the wireless device. Processor 6003 can receive a transfer message from the CU node through network interface 6005. The transfer message can include an RRC reconfiguration message for the wireless device. Processor 6003 can transmit the RRC reconfiguration message through transceiver 6001 to the wireless device (UE). Processor 6003 can receive an RRC reconfiguration complete message from the wireless device (UE) through transceiver 6001 after transmitting the RRC reconfiguration message. Processor 6003 can transmit an uplink transfer message through network interface 6005 to the CU node. The uplink transfer message can include the RRC reconfiguration complete message.

Various operations of FIGS. 9, 12, and 14 may be optional with respect to some embodiments. Regarding methods of example embodiment 1, for example, operations of blocks 8041, 8043, 8045, 8047, 8049, 8051, and 8053 of FIG. 12 and/or blocks 8041, 8042*a-d*, 8043, 8045, 8047, 8049, 8051, and 8053 of FIG. 14 may be optional. Regarding methods of example embodiment 25, for example, operations of blocks 8001 and 8003 of FIG. 9 and/or blocks 8043, 8045, 8047, 8049, 8051, and 8053 of FIG. 12 and/or blocks 8042*a-d*, 8043, 8045, 8047, 8049, 8051, and 8053 of FIG. 14 may be optional.

Figure 10:
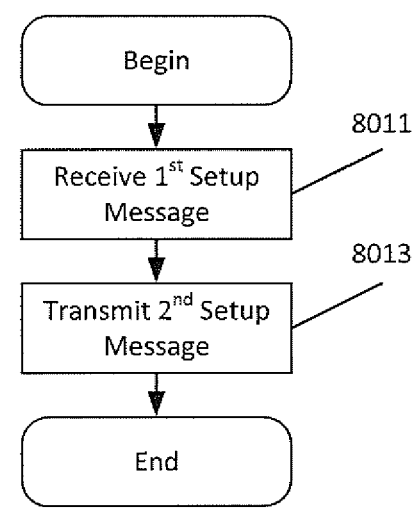
FIG. 10 is a flow chart illustrating an example of operations of a CU according to some embodiments of the present disclosure.
Figure 11:
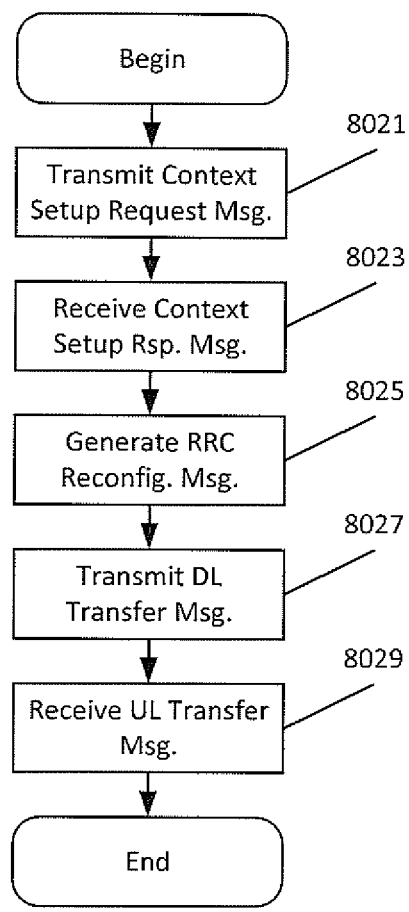
FIG. 11 is a flow chart illustrating another example of operations of a CU according to some embodiments of the present disclosure.
Figure 13:
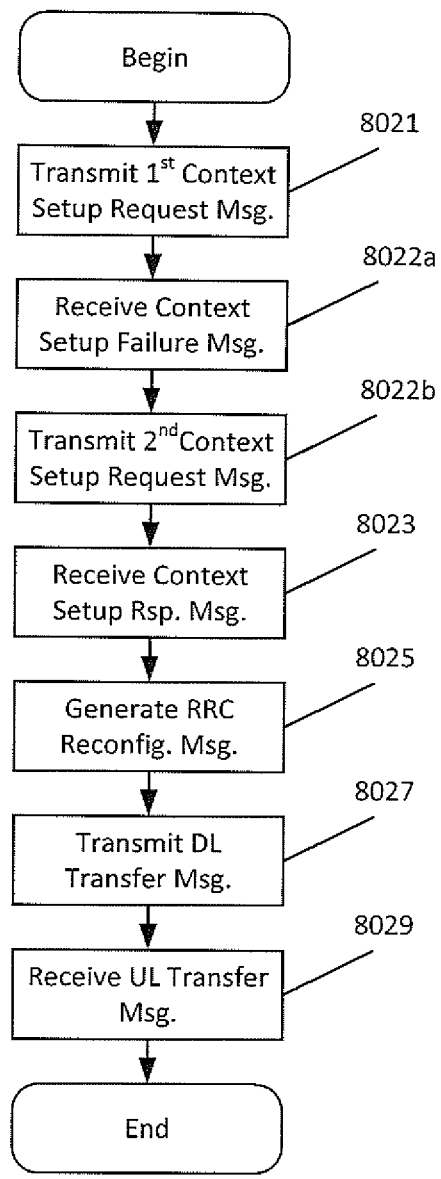
FIG. 13 is a flow chart illustrating another example of operations of a CU according to some embodiments of the present disclosure.

Operations of CU node 7000 are illustrated by the flow charts in FIGS. 10, 11, and 13 according to some embodiments of the present disclosure. For example, modules may be stored in memory 7005 of FIG. 8, and these modules may provide instructions so that when the instructions of a module are executed processor 7003, processor 7003 performs respective operations of the flow chart of FIGS. 10, 11, and 13. Moreover, CU node 7000 may be a node of a gNB that also includes a central unit DU node with which DU node 7000 communicates.

FIG. 10 illustrates an example of CU node operations for some embodiments. CU node operations of FIG. 10 may correspond to DU node operations discussed above with respect to FIG. 9. At block 8011, processor 7003 can transmit a first message through network interface 7001 to a DU node. The message can include an indication of an RRC version supported by the CU node. At block 8013, processor 7003 can receive a second message from the DU node through network interface 7001. The second message can include an indication of an RRC version supported by the DU node.

In additional or alternative embodiments, the indication of the RRC version supported by the DU node can include a list of RRC versions supported by the DU node, and/or the indication of the RRC version supported by the DU node can include a most current RRC version supported by the DU node.

In additional or alternative embodiments, the indication of the RRC version supported by the CU node can include a list of RRC versions supported by the CU node, and/or the indication of the RRC version supported by the CU node can include a most current RRC version supported by the CU node.

In additional or alternative embodiments, the indication of the RRC version supported by the DU node includes at least one release number of an RRC version supported by the DU node. The indication of the RRC version supported by the CU node can include at least one release number of an RRC version supported by the CU node.

In additional or alternative embodiments, the first message can be a setup request message. The second message can be a setup response message.

In additional or alternative embodiments, the DU node and the CU node can be coupled over an F1 interface. The first and second messages can be first and second setup messages of an F1 setup procedure. The first setup message can be received over the F1 interface from the DU node. The second setup message can be transmitted over the F1 interface to the DU node.

In additional or alternative embodiments, DU node and the CU node can be coupled over an F1 interface and over an Operation and Maintenance, O&M, interface. The first message can be received over the O&M interface from the DU node. The second message can be transmitted over the O&M interface to the DU node.

FIG. 11 illustrates an example of CU node operations for some embodiments (e.g., example embodiments 15-22 below). CU node operations of FIG. 11 may correspond to DU node operations discussed above with respect to FIG. 12. At block 8021, processor 7003 can transmit a context setup request message for a UE through network interface 7001 to a DU node 6000 of the radio access network. The context setup request message can include an indication of an RRC version to be used for an RRC connection between the UE and the DU node. At block 8023, processor 7003 can receive a context setup response message for the UE from the DU node 6000 through network interface 7001 after transmitting the context setup request. At block 8025, processor 7003 can generate the RRC reconfiguration message based on the RRC version to be used for the RRC connection and based on the context setup response message. At block 8027, processor 7003 can transmit a downlink transfer message through network interface 7001 to the DU node responsive to receiving the context setup response message for the UE. The downlink transfer message can include an RRC reconfiguration message for the UE. At block 8029, processor 7003 can receive an uplink transfer message from the DU node through network interface 7001 after transmitting the downlink transfer message. The uplink transfer message can include an RRC reconfiguration complete message.

The context setup response message can include measurement gap offset information and/or cell group configuration information for the RRC connection between the wireless device UE and the DU node.

In additional or alternative embodiments, the context setup response message can include cell group configuration information including at least one of physical layer and/or medium access control layer information.

In additional or alternative embodiments, before transmitting the context setup request message, processor 7003 can receive a setup message of a setup procedure from the DU node, for example, as discussed above with respect to FIG. 10. The first setup message can include an indication of an RRC version supported by the DU node. The indication of the RRC version can be used for the RRC connection between the wireless device (UE) and the DU node can be selected by the CU node based on the indication of the RRC version supported by the DU node.

In additional or alternative embodiments, the indication of the RRC version to be used for the RRC connection between the wireless device (UE) and the DU node can be selected by the CU node base on at least one of an RRC capability of the wireless device (UE) and/or an RRC capability of the CU node. FIG. 13 illustrates an example of DU node operations for embodiments (e.g., example embodiment 23-24). CU node operations of FIG. 13 may correspond to DU node operations discussed above with respect to FIG. 14. FIG. 13 is similar to FIG. 11, but includes blocks 8022a-b. At block 8021, processor 7003 can transmit a first context setup request message for a wireless device (UE) through network interface 7001 to a distributed unit DU node of the radio access network, with the context setup request message includes an indication of a Radio Resource Control, RRC, version to be used for an RRC connection between the wireless device (UE) and the DU node. At block 8022a, after transmitting the first context setup request message, processor 7003 can receive a context setup failure message from the DU node through network interface 7001. At block 8022b, responsive to receiving the context setup failure message from the DU node, processor 7003 can transmit a second context setup request message for the wireless device (UE) through network interface 7001 to the DU node. The second context setup request message can include an indication of a second RRC version to be used for the RRC connection between the wireless device (UE) and the DU node. The first and second RRC versions can be different.

At block 8023, processor 7003 can receive a context setup response message for the wireless device (UE) from the DU node through network interface 7001 after transmitting the second context setup request. At block 8025, processor 7003 can generate the RRC reconfiguration message based on the second RRC version to be used for the RRC connection and based on the context setup response message. At block 8027, processor 7003 can transmit a downlink transfer message through network interface 7001 to the DU node responsive to receiving the context setup response message for the wireless device (UE), wherein the downlink transfer message includes the RRC reconfiguration message for the wireless device (UE). At block 8029, processor 7003 can receive an uplink transfer message from the DU node through network interface 7001 after transmitting the downlink transfer message, wherein the uplink transfer message includes an RRC reconfiguration complete message.

Various operations of FIGS. 10, 11, and 13 may be optional with respect to some embodiments. Regarding methods of example embodiment 8, for example, operations of blocks 8021, 8023, 8025, 8027, and 8029 of FIG. 11 and/or blocks 8021, 8022a-b, 8023, 8025, 8027, and 8029 of FIG. 13 may be optional. Regarding method of example embodiment 15, for example, operations of blocks 8011 and 8013 of FIG. 10 and/or blocks 8023, 8025, 8027, and 8029 of FIG. 11 and/or blocks 8022a-b, 8023, 8025, 8027, and 8029 of FIG. 13 may be optional.

Figure 16:
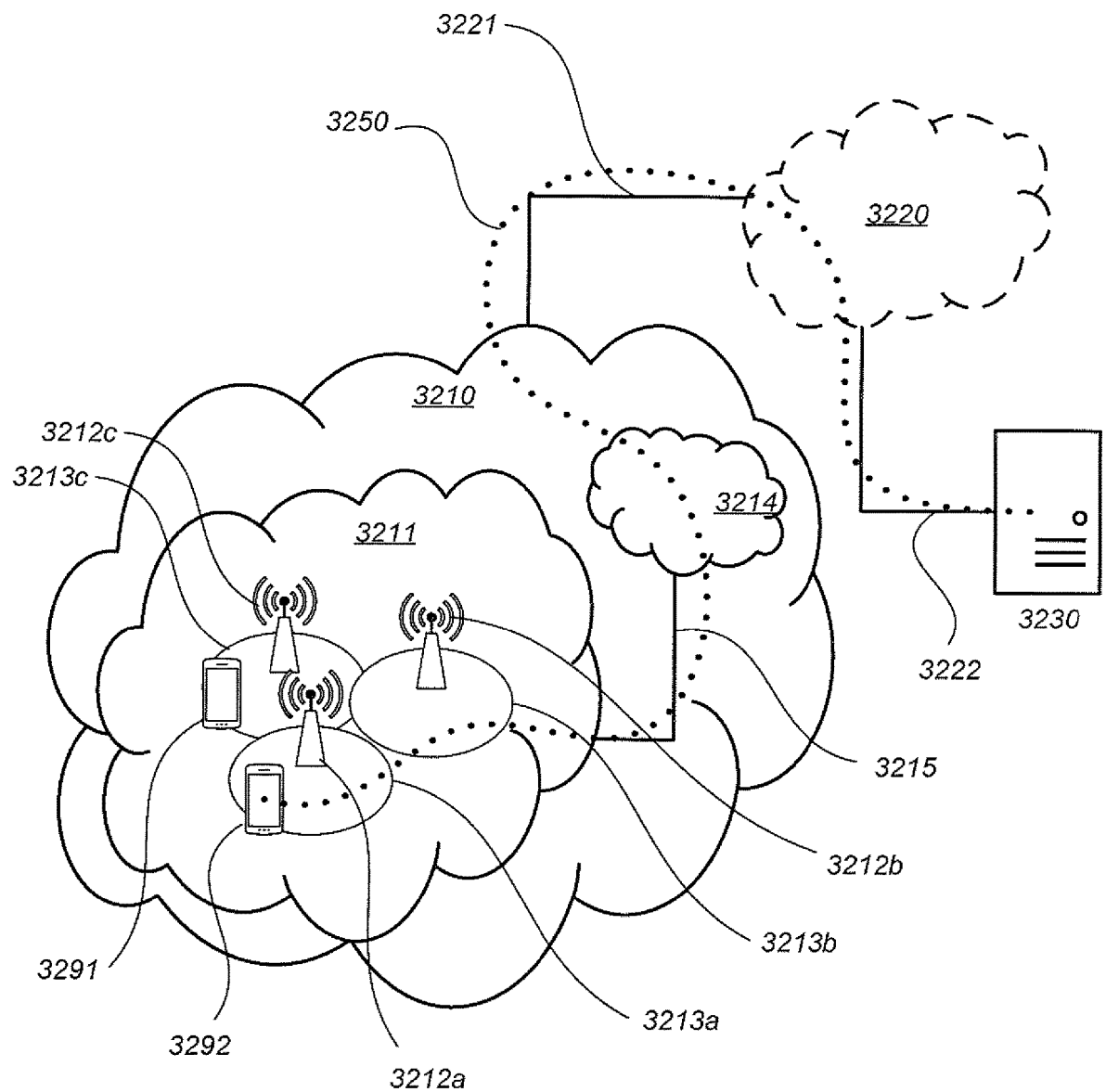
FIG. 16 schematically illustrates a telecommunication network connected via an intermediate network to a host computer.

With reference to FIG. 16, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 17:
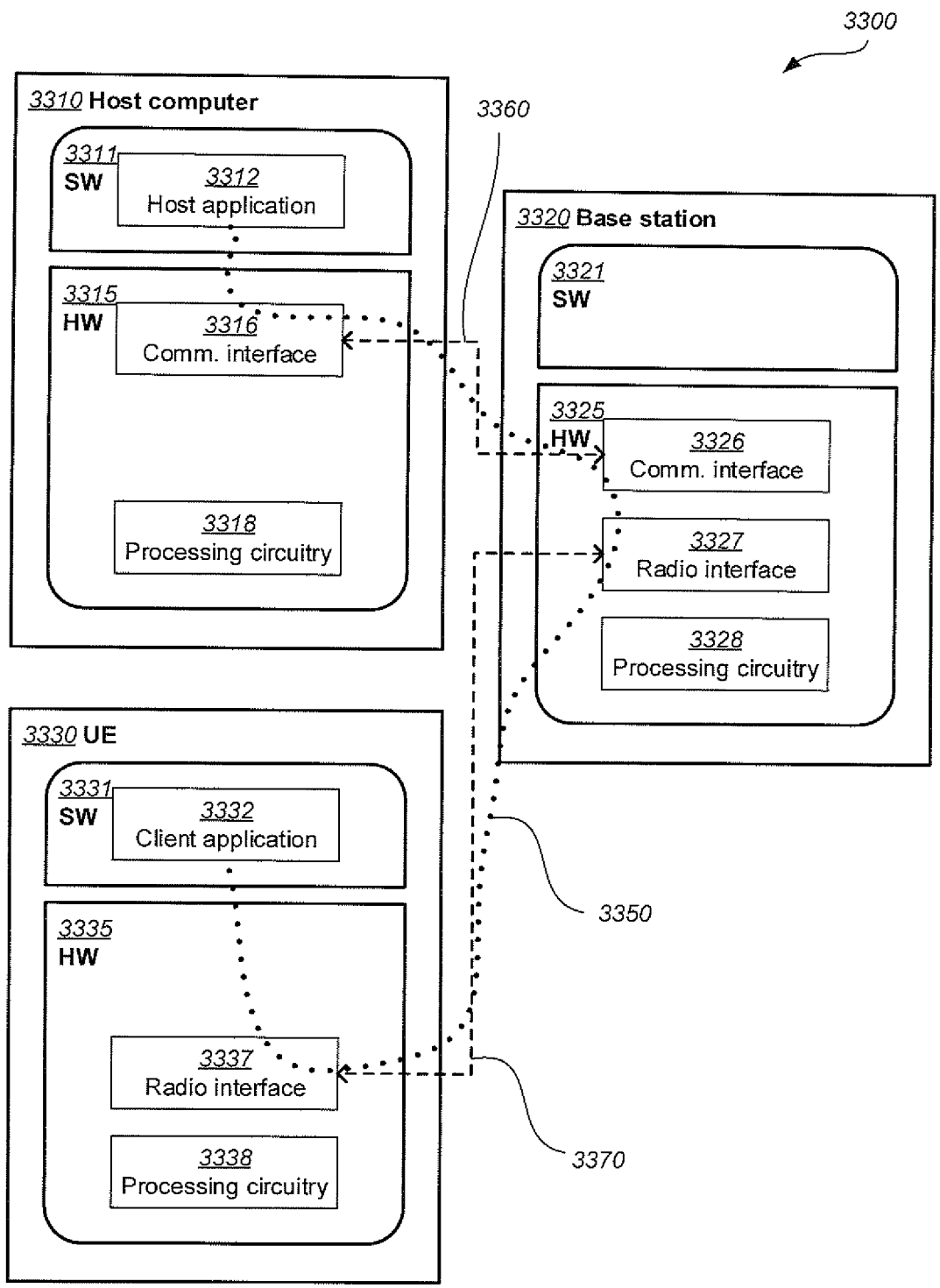
FIG. 17 is a generalized block diagram of a host computer communicating via a base station with a user equipment over a partially wireless connection.

It is noted that the host computer 3310, base station 3320 and UE 3330 illustrated in FIG. 17 may be identical to the host computer 3230, one of the base stations 3212a, 3212b, 3212c and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 18, 19:
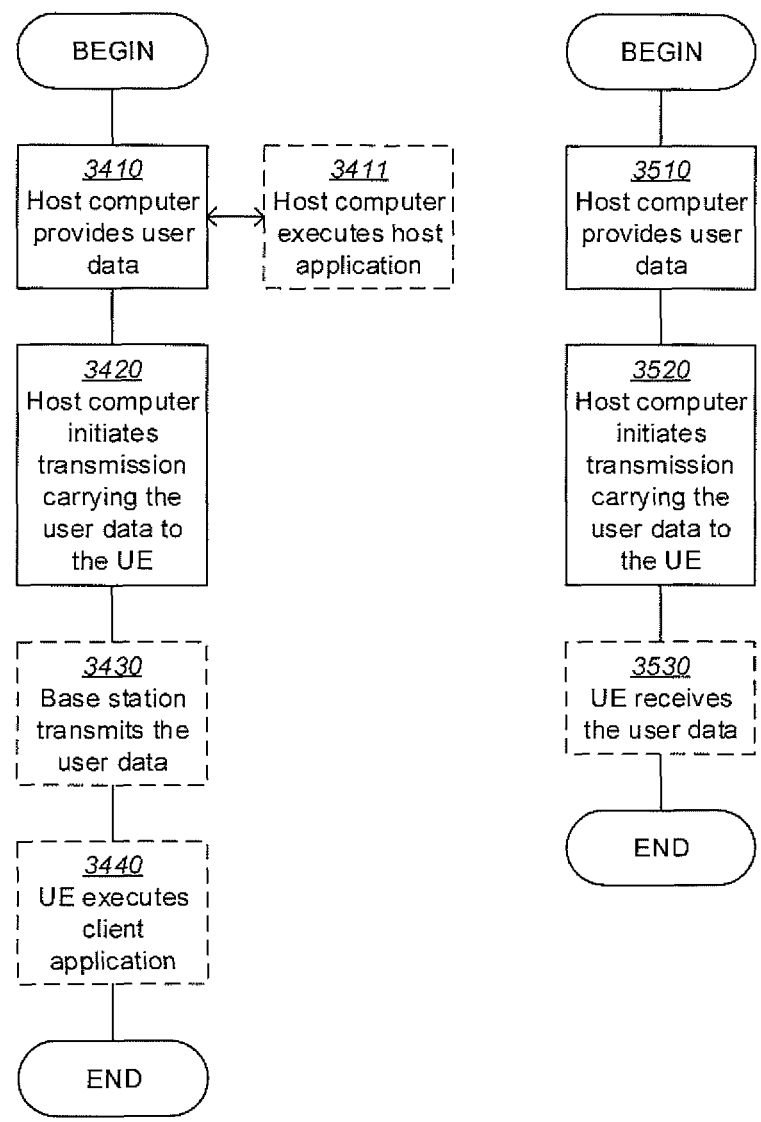
FIGS. 18 to 21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 19 is a flowchart illustrating a method implemented in a communication system, in accordance with one embodiment. The communication system includes a host computer, a base station and a UE which may be those described previously. For simplicity of the present disclosure, only drawing references to FIG. 19 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 20, 21:
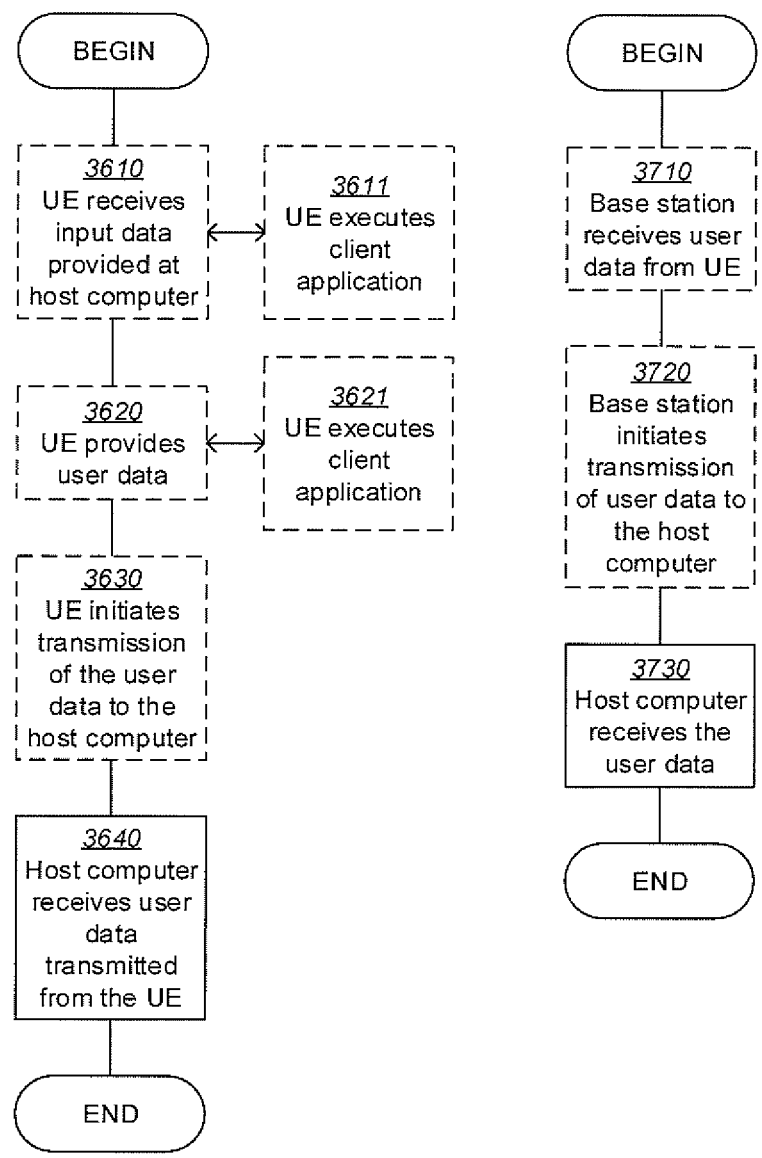

FIG. 20 is a flowchart illustrating a method implemented in a communication system, in accordance with one embodiment. The communication system includes a host computer, a base station and a UE which may be those described previously. For simplicity of the present disclosure, only drawing references to FIG. 20 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described previously. For simplicity of the present disclosure, only drawing references to FIG. 21 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention claimed is:

1. A method of operating a distributed unit, DU, node of a radio access network, wherein the DU node is coupled to a central unit, CU, node over an F1 interface, and wherein the DU node performs a setup procedure with the CU node over the F1 interface for an RRC connection with respect to a wireless device, UE, the method comprising:
   transmitting a setup request message to the CU node, wherein the setup request message includes an indication of a latest Radio Resource Control, RRC, version supported by the DU node; and
   receiving a setup response message from the CU node, wherein this message includes an indication of an RRC version supported by the CU node and by the UE, and establishing an RRC connection with the UE using the RRC version indicated in the setup response message.

2. The method of claim 1, wherein setup request message includes a list of RRC versions including the latest RRC version supported by the DU node.

3. The method of claim 1, wherein the setup response message includes the latest RRC version supported by the CU node and the UE, or a list of RRC versions including the latest RRC version supported by the CU node and the UE.

4. The method of claim 1, wherein the indication of the latest RRC version supported by the DU node includes at least one release number of an RRC version supported by the DU node, and wherein the indication of the RRC version supported by the CU node and the UE includes at least one release number of an RRC version supported by the CU node and the UE.

5. A method of operating a central unit, CU, node of a radio access network, wherein the CU node is coupled to a distributed unit, DU, node over an F1 interface, and wherein the DU node performs a setup procedure with the CU node over the F1 interface for an RRC connection with respect to a wireless device, UE, the method comprising:
   receiving a setup request message from the DU node, wherein the setup request message includes an indication of a latest supported Radio Resource Control, RRC, version supported by the DU node; and
   transmitting a second message to the DU node, wherein the second message includes an indication of an RRC version supported by both the CU node and the UE node to be used by the DU for the RRC connection between the UE and the DU node,
   wherein the RRC version is selected bases on an RRC capability of the UE and an RRC capability of the CU node.

6. The method of claim 5, wherein the indication of the RRC version supported by the DU node includes a list of RRC versions supported by the DU node.

7. The method of claim 5, wherein the setup response message includes the latest RRC version supported by the CU node and the UE, or a list of RRC versions including the latest RRC version supported by the CU node and the UE.

8. The method of claim 5, wherein the indication of the RRC version supported by the DU node includes at least one release number of an RRC version supported by the DU node, and wherein the indication of the RRC version supported by the CU node includes at least one release number of an RRC version supported by the CU node.

9. The method of claim 8, wherein the context setup request message is a first context setup request message, and wherein the indication is an indication of a first RRC version, the method further comprising:
   after transmitting the first context setup request message, receiving a context setup failure message from the DU node; and
   responsive to receiving the context setup failure message from the DU node, transmitting a second context setup request message for the UE to the DU node, wherein the second context setup request message includes an indication of a second RRC version to be used for the RRC connection between the UE and the DU node, wherein the first and second RRC versions are different.

10. The method of claim 9 further comprising:
   receiving a context setup response message for the UE from the DU node after transmitting the second context setup request;

generating a RRC reconfiguration message based on the second RRC version to be used for the RRC connection and based on the context setup response message;

transmitting a downlink transfer message to the DU node responsive to receiving the context setup response message for the UE, wherein the downlink transfer message includes an RRC reconfiguration message for the UE; and receiving an uplink transfer message from the DU node after transmitting the downlink transfer message, wherein the uplink transfer message includes an RRC reconfiguration complete message.

11. The method of claim 5, further comprising:

transmitting a context setup request message for a wireless device, UE, to the DU node, wherein the context setup request message includes an indication of a Radio Resource Control, RRC, version to be used for an RRC connection between the UE and the DU node.

12. The method of claim 11 further comprising:

receiving a context setup response message for the UE from the DU node after transmitting the context setup request; and transmitting a downlink transfer message to the DU node responsive to receiving the context setup response message for the UE, wherein the downlink transfer message includes an RRC reconfiguration message for the UE.

13. The method of claim 12 further comprising:

receiving an uplink transfer message from the DU node after transmitting the downlink transfer message, wherein the uplink transfer message includes an RRC reconfiguration complete message.

14. The method of claim 12 further comprising:

generating the RRC reconfiguration message based on the RRC version to be used for the RRC connection and based on the context setup response message.

15. The method of claim 12, wherein the context setup response message includes measurement gap offset information and/or cell group configuration information for the RRC connection between the UE and the DU node.

16. The method of claim 15, wherein the context setup response message includes cell group configuration information including at least one of physical layer and/or medium access control layer information.

17. A distributed unit, DU, node of a radio access network, the first DU node comprising:

an F1 network interface configured to provide communications over a network;

a transceiver configured to provide wireless communication over a radio interface; and a processor coupled with the F1 network interface and the transceiver, wherein the processor is configured to provide communication with a central unit, CU, node through the F1 network interface, wherein the processor is configured to provide communication with a plurality of wireless communication devices through the transceiver, wherein the DU node performs a setup procedure with the CU node over the F1 interface for an RRC connection with respect to a wireless device, UE, and wherein the processor is configured to, transmit a setup request message to the CU node, wherein the setup request message includes an indication of a latest Radio Resource Control, RRC, version supported by the DU node, receive a setup response message from the CU node, wherein this message includes an indication of an RRC version supported by the CU node and by the UE, and establish an RRC connection with the UE using the RRC version indicated in the setup response message.

18. A central unit, CU, node of a radio access network, the CU node comprising:

an F1 network interface configured to provide communications over a network; and a processor coupled with the network interface, wherein the processor is configured to provide communication with at least one distributed unit, DU, node through the F1 network interface, wherein the DU node performs a setup procedure with the CU node over the F1 interface for an RRC connection with respect to a wireless device, UE, and wherein the processor is configured to, receive a setup request message from the DU node, wherein the setup request message includes an indication of a latest supported Radio Resource Control, RRC, version supported by the DU node, and transmit a second message to the DU node, wherein the second message includes an indication of an RRC version supported by both the CU node and the UE node to be used by the DU for the RRC connection between the UE and the DU node, wherein the RRC version is selected bases on an RRC capability of the UE and an RRC capability of the CU node.

* * * * *